Feb. 25, 1958   E. SCHMID   2,824,357
MANUFACTURING PROCESSES OF BALL
CAGES FOR BALL BEARINGS
Filed Jan. 18, 1954

INVENTOR:
ERNEST SCHMID
BY Toulmin & Toulmin
ATTORNEYS

United States Patent Office 2,824,357
Patented Feb. 25, 1958

2,824,357

MANUFACTURING PROCESSES OF BALL CAGES FOR BALL BEARINGS

Ernest Schmid, Zurich, Switzerland

Application January 18, 1954, Serial No. 404,542

2 Claims. (Cl. 29—148.4)

The present invention concerns a process of manufacturing a ball cage for ball bearing.

It is already known how to center a ball cage in a ball bearing, as well with regard to the internal annular body as with regard to its external annular body; known is also how to manufacture such ball cages in a massive form, for instance in bronze, as well, as in a less solid shape, by making them of two separated parts to be jointed together and made of flanged plates by pressing operations.

The manufacturing process according to the present invention concerns a ball cage of the latter type, to be centered with regard to the external annular body of the ball bearing, and made of two half-cages, same half-cages being provided alternatively with plane assembling parts to be jointed together and with half-cylindrically shaped, parts whose axis are directed radially in order to constitute pockets for the balls, each half-cage presenting a lateral rim delimiting a cylindrical surface external to the ball cage, whose object is the centering of the same. But, until now, the manufacturing of such half-cages used to be done by pressing a metallic annular disk of non-circular shape, but having an undulated circumference, in order to enable the correct shaping of the lateral rim in accordance to a required profile and without notable deformation of the initial metallic disk.

The process according to the present invention does not require any particular shape for ring-shaped disc but operates with an ordinary one that is with a ring-shaped disc delimited by two concentric circles which has to be pressed so that the lateral rim delimiting the cylindric surface external to the ball cage is produced by a lengthening operation of the metallic material constituting said ring-shaped disc.

In this manner, the manufacturing work is not only simplified but it is also possible to make use of an ordinary not specially profiled ring-shaped disk and to reduce the cost of fabrication in proportion. A further advantage of said process is that the metallic material constituting the lateral rim is lengthened in such a way that its surface becomes perfectly smooth, and consequently well fit for the centering of the ball cage in the ball bearing with very little friction.

The annexed drawing shows by way of example an embodiment of a ball cage manufactured according to the present process.

Figure 1:
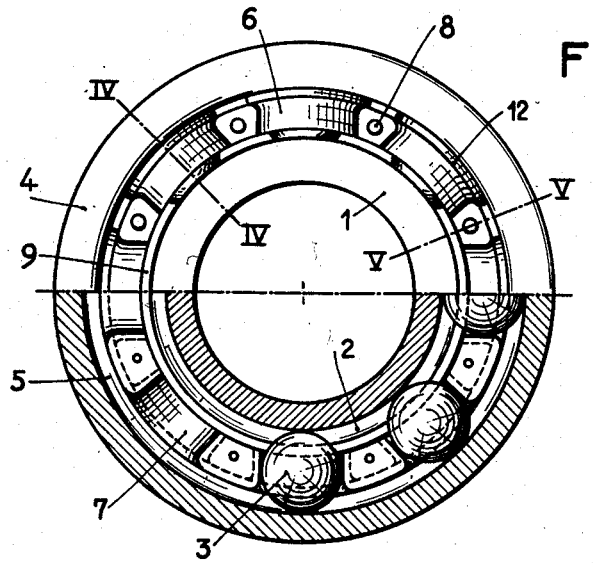
Fig. 1 shows a ball bearing provided with its ball cage, the inferior part of said figure being an axial section drawn perpendicularly to the ball bearing and in the plane of assembling of both half-cages, the anterior one with regard to the drawing surface having been eliminated as well as two balls of the eight balls of the represented bearing.

The ball bearing shown on the drawing with the ball cage to be described in the following comprises an internal annular body 1 with a bearing surface 2, the balls 3 and the external annular body 4, with its bearing surface 5. The balls 3 are maintained and guided by a ball cage made of flanged metallic plates obtained by successive pressing operations and made of two half-parts 6 and 7, which are fixed together by means of rivets 8.

As it appears in Fig. 1, the present ball cage is centered with regard to the external annular body 4 of the ball bearing, while there is some play 9 between the ball cage and the internal annular body 1.

Two balls of the eight of the described ball bearing are omitted in Fig. 1 in order to make visible in full the left inferior part of the half-cage 7.

Each of these half-cages has been made from an ordinary ring-shaped disk of no particular profile by means of pressing operation, i. e. from a metallic disk delimited by two concentric circles.

Figure 2:
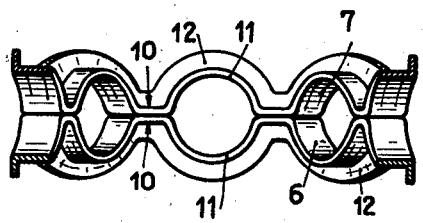
Fig. 2 shows a section of the above mentioned ball cage drawn according to a diameter of the bearing and seen from the inside.

These manufacturing operations are remoulding the central part of the annular disk in such a way that assembling plane surfaces 10 (see Fig. 2) are preserved in order to be joined together, that is to say that similar parts of the one half-cage are assembled with the corresponding plane parts of the second half-cage, alternatively with a couple of two half-cylindrical parts 11 (see Fig. 2) which are joined together in order to form a cylindrical pocket whose axis is directed radially and whose purpose is to contain and to guide one bearing ball 3.

With regard to the external part of the disk, it may be seen that a lateral rim or surface 12 is formed at right angle to its original surface, with the object of delimiting a cylindrical surface external to the cage and by help of which said cage is exactly centered within the external annular body 4 of the bearing. As stated before, the above mentioned rim is the result of a pressing respectively lengthening operation so that its surface is perfectly smooth, i. e. that same surface is so much the more fit to facilitate the centering of the ball cage inside the external annular body with the least possible friction.

Figure 3:
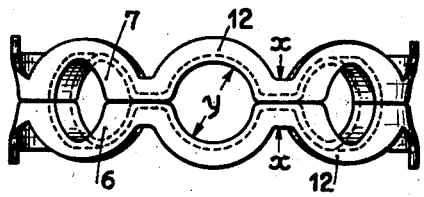
Fig. 3 is a similar view, but from outside.
Figures 4, 5:
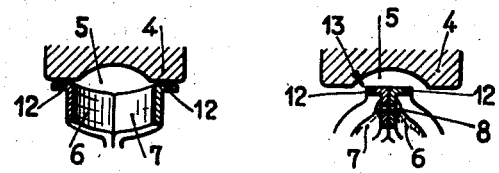
Fig. 4 is a cross-section along IV—IV of Fig. 1.
Fig. 5 is a cross-section along V—V of Fig. 1.

The obtained rim 12 has practically an equal width everywhere, i. e. that the combined width of joined rims measured axially in 10, where both plane surfaces are joined together, that is between the arrows x of Fig. 3, is less than the internal free diameter y of the cylindrical pockets guiding the balls of the bearing. At it may be seen in Fig. 5, the above mentioned profile shows most suitably the advantage of profiles of this type, i. e. that oppositely to each joining space of both half-cages, for example in 13, the external bearing surface is accessible in spite of the presence on the entire periphery of the centering external and smooth surface of the cage. This characteristic not only facilitates the cleaning of the ball bearing, but it makes also more easy its correct lubrication, even with grease and at the highest speed.

What I claim is:

1. In a method of making a half-cage for an externally guided ball bearing cage comprising a pair of half cages, the steps of forming a flat annular ring-shaped disc having its inner and outer edges defined by concentric circles into a substantially corrugated annulus having alternately plane assembling portions and half cylindrical portions whose axes are directed radially, and drawing up the outer periphery of the corrugated annulus to form an axially extending rim of even width around each half cage to evenly center the assembled bearing cage in the outer race of the ball bearing and to define a cylindrical surface external to the assembled ball cage.

2. In a method of making a half-cage for an externally guided ball bearing cage comprising a pair of half cages, the steps of forming a flat annular ring-shaped disc having its inner and outer edges defined by concentric circles into a corrugated annulus having similarly shaped corrugations whose axes are directed radially, forming plane assembling portions on alternate of the troughs of the corrugation of said annulus and forming the remaining corrugations into half cylindrical portions whose axes are directed radially, and drawing up the outer periphery of the corrugated annulus to form an axially extending rim of even width around each half cage whereby the assembled bearing cage may be evenly centered in the outer race of the ball bearing and to define a cylindrical surface external to the assembled ball cage.

References Cited in the file of this patent
UNITED STATES PATENTS

| | | |
|---|---|---|
| 1,463,299 | Staake | July 31, 1923 |
| 1,602,350 | Fernstrom | Oct. 5, 1926 |
| 1,629,173 | Parsons | May 17, 1927 |
| 1,712,222 | Linde | May 7, 1929 |
| 1,733,673 | Rouanet | Oct. 29, 1929 |
| 1,793,896 | Barish | Feb. 24, 1931 |
| 2,480,258 | Parsons | Aug. 30, 1949 |
| 2,525,622 | Shafer | Oct. 10, 1950 |